United States Patent Office 3,567,282
Patented Mar. 2, 1971

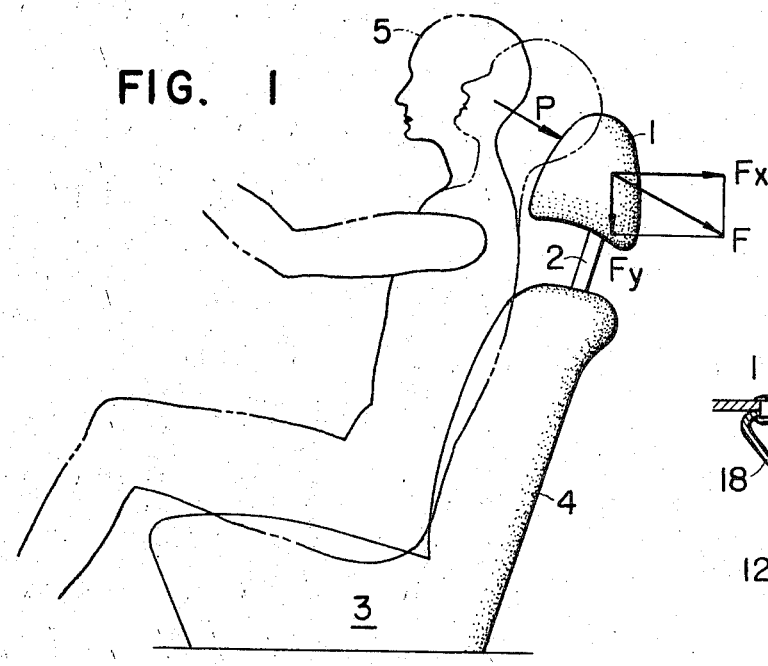
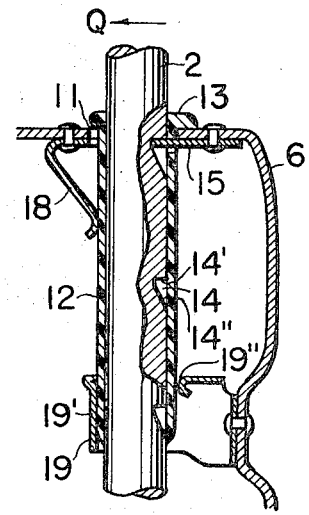
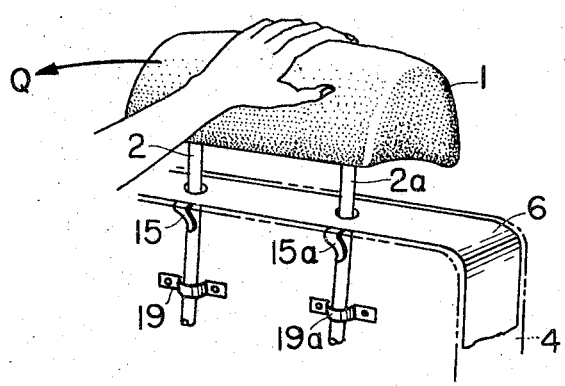
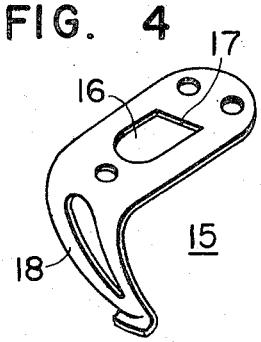

3,567,282
VEHICLE SEAT ADJUSTABLE HEAD REST
Seizho Ohta, Toyota-shi, and Motokuni Kage, Aichi-ken, Japan, assignors to Toyota Jidosha Kogyo Kabushiki Kaisha, Toyota-cho, Toyota-shi, Aichi-ken, Japan
Filed Oct. 2, 1968, Ser. No. 764,487
Claims priority, application Japan, Oct. 4, 1967, 42/84,014
Int. Cl. A47c 7/36, 7/42
U.S. Cl. 297—410
3 Claims

ABSTRACT OF THE DISCLOSURE

An adjustable head rest for a vehicle seat is formed by a support rod fitted at its upper end into a head rest member and at its lower end into the frame of the vehicle seat. Means are adjustably positionable on the supporting rod for varying the height of the head rest above seat. For such adjustable positioning, recesses are formed along one side of the supporting rod. A retaining member, secured to the vehicle seat, has an edge engageable with one of the recesses and a biasing strip for acting on the opposite side of the supporting rod to bring one of the recesses into engagement with the edge. A guide member for guiding the supporting rod in its longitudinal direction has an edge serving as a bearing point for the supporting rod to be swung against the biasing force of the biasing strip.

SUMMARY OF THE INVENTION

The invention relates to a head rest assembly for a vehicle seat, and more particularly to means for adjustably positioning the head rest relative to the vehicle seat.

Recently head rests have been used on the seats in motor vehicles to limit the severity of head and neck injuries caused by rear end collisions. The great number and seriousness of neck injuries, often referred to as whip lash injuries, caused by rear end collisions has pointed up the need to afford protection for the driver and passengers from such injuries. However, while head rests limit the extent to which a person's head is thrown rearwardly as the result of a rear end collision, it must also be kept in mind that the rearward field of vision of the driver must not be seriously reduced.

In maintaining the size of the head rest within limits which will not encroach, to any great extent, on the field of vision of the driver it is also important to provide a head rest which is adjustably positionable to the height of the person using the seat. Moreover, since the adjustment of the head rest is normally a hand operation, the adjustment means must be easy to use while affording a positive engagement for the head rest in the desired position.

When a collision takes place and a person's head is thrown rearwardly, it generally strikes the head rest in a downwardly inclined direction whereby the force of the impact has a vertical and a horizontal component. Various experiments have shown that the vertical component of impact often exceeds 60 kg. As a result, it is necessary to provide locking means for holding the head rest in place against such a downward component of force. Therefore, it would not be adequate to provide a frictional engagement between the support rod for the head rest and the seat frame sufficient to counteract the vertical component of impact since such an arrangement would make adjustment extremely difficult. For ease in adjustment the means for positioning the head rest must be simple to operate, yet adequate to withstand the force generated by the impact of a person's head against the head rest.

Accordingly, it is the primary object of the present invention to provide a head rest assembly whose height above the seat is adjustable, yet is sufficient to support the head rest against the impact when a person's head is thrown rearwardly against it.

Another object of the invention is to employ hand operated means for adjusting the head rest which are easily manipulatable, yet sufficiently support the head rest against impact.

Therefore, the present invention is directed to an adjustable head rest for a vehicle seat in which a head rest member is mounted on the upper end of a supporting rod while the lower end of the supporting rod is fitted within the frame of the vehicle head. Means are provided for engaging the supporting rod and supporting it from the vehicle whereby the height of the head rest member is adjustable relative to the vehicle seat.

Other features and advantages will be apparent from the following description, taken in connection with the accompanying drawing.

BRIEF DESCRIPTION OF THE DRAWING

FIG. 1 is a schematic sieved view of a vehicle seat and a head rest and illustartes the components of force acting on the head rest due to a rearwardly directed impact;

FIG. 2 is a perspective view of a head rest and illustrates an embodiment of the present invention for adjusting the head rest;

FIG. 3 is a longitudinal sectional view of the positioning means disclosed in FIG. 2; and, FIG. 4 is a perspective view of a retaining member of the positioning member.

DETAILED DESCRIPTION OF A PREFERRED EMBODIMENT

In FIG. 1 a head rest assembly formed of a head rest member 1 and supporting rods 2 are mounted on the top of a vehicle seat 3 which may be of any known type. If the vehicle is involved in a rear end collision, there is a tendency for the person's head 5 to snap rearwardly, as shown in dot-dash lines, and to strik the head rest member 1 in the direction indicated by the arrow. Due to the direction of impact against the head rest member 1, the impact force F has a horizontal component of force Fx and a vertical component of force Fy. The vertical component of force Fy tends to force the head rest downwardly into the back 4 of the seat 3.

In FIGS. 2 to 4 an embodiment is shown for adjustably positioning the head rest member in the vetrical direction. Since there can be considerable variation in the height of a person's head above the back 4 of the seat, it is important to provide a wide range of adjustability for the head rest member and, at the same time to employ a means which is easily manipulatable for properly adjusting the height of the head rest member 1.

The head rest member 1 is shown supported on the back 4 of the seat 3 by means of two rods 2, 2a. As indicated in FIG. 3, the rod 2 extends downwardly through a hole 11 in the top of the frame 6 of the seat. The diameter of the hole 11 is formed longer in the forward direction for such reason as will be explained later. For the smooth guide of the supporting rod 2 in its axial direction, a synthetic resin bush 12 is fitted loosely on the supporting rod 2. The flange 13 at the top of the bush 12 rests on the edge of the hole 11 of the frame 6.

Formed at intervals along the back side of the supporting rod 2 are a plurality of wedge-shaped recesses 14, each consisting of a face 14′ perpendicular to the axial direction of the supporting rod 2 and an inclined face 14″ oblique downwardly with respect to said face. In order to engage one of the recesses 14 of the supporting rod 2 thereby retaining this supporting rod at a suitable position for the occupant of the seat, a retaining strip 15 made of resilient metal is secured to the top of the frame 6 by riveting. This retaining strip 15 has a hole 16 through which the supporting rod 2 passes. The front side of the hole 16 is similar in its configuration to that of the hole 11 while its back side projects into the recess 14 of the supporting rod 2 to form an engagement edge 17. The front portion 18 of the retaining strip 15 is bent obliquely downwardly toward the supporting rod 2, and pushes the supporting rod backwardly. At a distance under the retaining strip 15, namely in the vicinity of the lower end of the bush 12, there is provided a guide member 19 surrounding the supporting rod 2 and secured to the frame 6 by riveting. The front side 19' of this guide member 19 is formed like a cylinder while the back side thereof is formed as a bent edge 19" so that the supporting rod 2 can be swung about the edge 19" forwardly, in the direction designated by an arrow Q.

Due to the impact against the head rest member 1, the vertical component of the impact force tends to force the head rest member 1 downwardly. However, since the face 14' of the recess 14 of the supporting rod 2 rests on the engagement edge 17 of the retaining strip 15 under the action of the retaining strip 15, the supporting rod 2, therefore, the head rest member 1 is effectively prevented from moving downwardly.

On the one hand, for adjustment of the height of the head rest, member 1, it is enough only to grip and pull forwardly the head rest member 1 as shown in FIG. 2. Then the supporting rod 2 is inclined forwardly about the edge 19" of the guide member 19 whereby the recess 19 is out of engagement with the engagement edge 17 so that the height of the head rest 1 can easily be adjusted.

Although the present invention has been described in conjunction with preferred embodiments, it is to be understood that modifications and variations may be resorted to without departing from the spirit and scope of the invention, as those skilled in the art will readily understand. Such modification and variations are considered to be within the purview and scope of the invention and appended claims.

We claim:
1. A head rest assembly for a vehicle seat which is mounted on said vehicle seat frame, comprising in combination:
 (a) a head rest member (1);
 (b) a supporting rod (2) fitted at its upper end into said head rest member and at its lower end into the vehicle seat frame, said rod having spaced engageable recesses (14) thereon;
 (c) a retaining member (15) with a retaining side and a biasing side secured to the vehicle seat, having an aperture (16) for said rod (2) to pass therethrough said aperture (16) having on said retaining side a retaining edge (17) for engaging one of said recesses and biasing means (18) on said biasing side for biasing said rod towards said edge, aperture (16) being horizontally disposed, with a straight edge towards said retaining side and a curved edge towards said biasing side; and,
 (d) guide means (19) for guiding said rod in its longitudinal direction, including pivot means (19") permitting said rod to swing out of engagement from said retaining edge (17).

2. A head rest assembly as claimed in claim 1, said support rod recesses having a saw-tooth configuration with a straight edge for said engaging retaining edge (17).

3. A head rest assembly as claimed in claim 2, said guide member (19) including a cylindrical portion in line with said biasing side and an edge (19") in line with said retaining side, said edge serving as a point for said rod to be swung out against the biasing force of said biasing means (18).

References Cited
UNITED STATES PATENTS

| | | | |
|---|---|---|---|
| 2,613,731 | 10/1952 | Roginski | 297——410X |
| 3,027,194 | 3/1962 | Rumptz | 297—410 |
| 3,063,751 | 11/1962 | Hatch | 297—410 |

CASMIR A. NUNBERG, Primary Examiner